United States Patent [19]

Takahara et al.

[11] Patent Number: 5,497,360
[45] Date of Patent: Mar. 5, 1996

[54] OPTICAL DISC APPARATUS WITH ACCESSING USING ONLY REFERENCE VELOCITY DURING ACCELERATION AND REFERENCE AND MOVING VELOCITIES DURING DECELERATION

[75] Inventors: Tamane Takahara, Tokyo; Akihiro Kasahara, Chiba, both of Japan

[73] Assignee: Kabushiki Kaisha Toshiba, Kawasaki, Japan

[21] Appl. No.: 202,134

[22] Filed: Feb. 25, 1994

[30] Foreign Application Priority Data

Mar. 24, 1993 [JP] Japan ................................. 5-065255

[51] Int. Cl.⁶ ........................................... G11B 7/085
[52] U.S. Cl. ......................... 369/44.28; 369/44.34; 369/54
[58] Field of Search .................... 369/32, 44.25, 369/44.28, 44.32, 44.34, 54; 360/78.06–78.08, 78.11

[56] References Cited

U.S. PATENT DOCUMENTS

| | | |
|---|---|---|
| 4,591,933 | 5/1986 | Quackenbush. |
| 4,622,604 | 11/1986 | Hashimoto et al.. |
| 5,301,174 | 4/1994 | Matoba et al. ............... 369/44.28 |
| 5,305,161 | 4/1994 | Giovanetti et al. .............. 360/78.06 |

FOREIGN PATENT DOCUMENTS

| | | |
|---|---|---|
| 0408392 | 1/1991 | European Pat. Off.. |
| 1271921 | 10/1989 | Japan. |
| 5-36095 | 2/1993 | Japan. |

OTHER PUBLICATIONS

"Disturbance tolerable servo systems for optical disk drive" Information, Intelligence, and Precision Equipment Division of the Machine Society of Japan (No. 920–67) IIP '92 Tokyo, Oct. 20–21, 1992, pp. 101–102.

Primary Examiner—W. R. Young
Attorney, Agent, or Firm—Cushman Darby & Cushman

[57] ABSTRACT

With this invention, the reference velocity data corresponding to the number of the remaining tracks to the destination target position of the optical head is stored, and on the basis of the reference velocity data, the velocity of the optical head is controlled. The reference velocity data contains the maximum velocity region data and deceleration data for the optical head. The deceleration data is obtained by subtracting the steady-state deviation from the velocity trajectory. The steady-state velocity deviation is obtained from the response characteristic of the optical-head velocity control system. When the optical head is moved, the reference velocity data corresponding to the number of the remaining tracks between the current position of the optical head and the destination target position is read. On the basis of this read-out reference velocity data, a linear motor for driving the optical head is controlled.

1 Claim, 7 Drawing Sheets

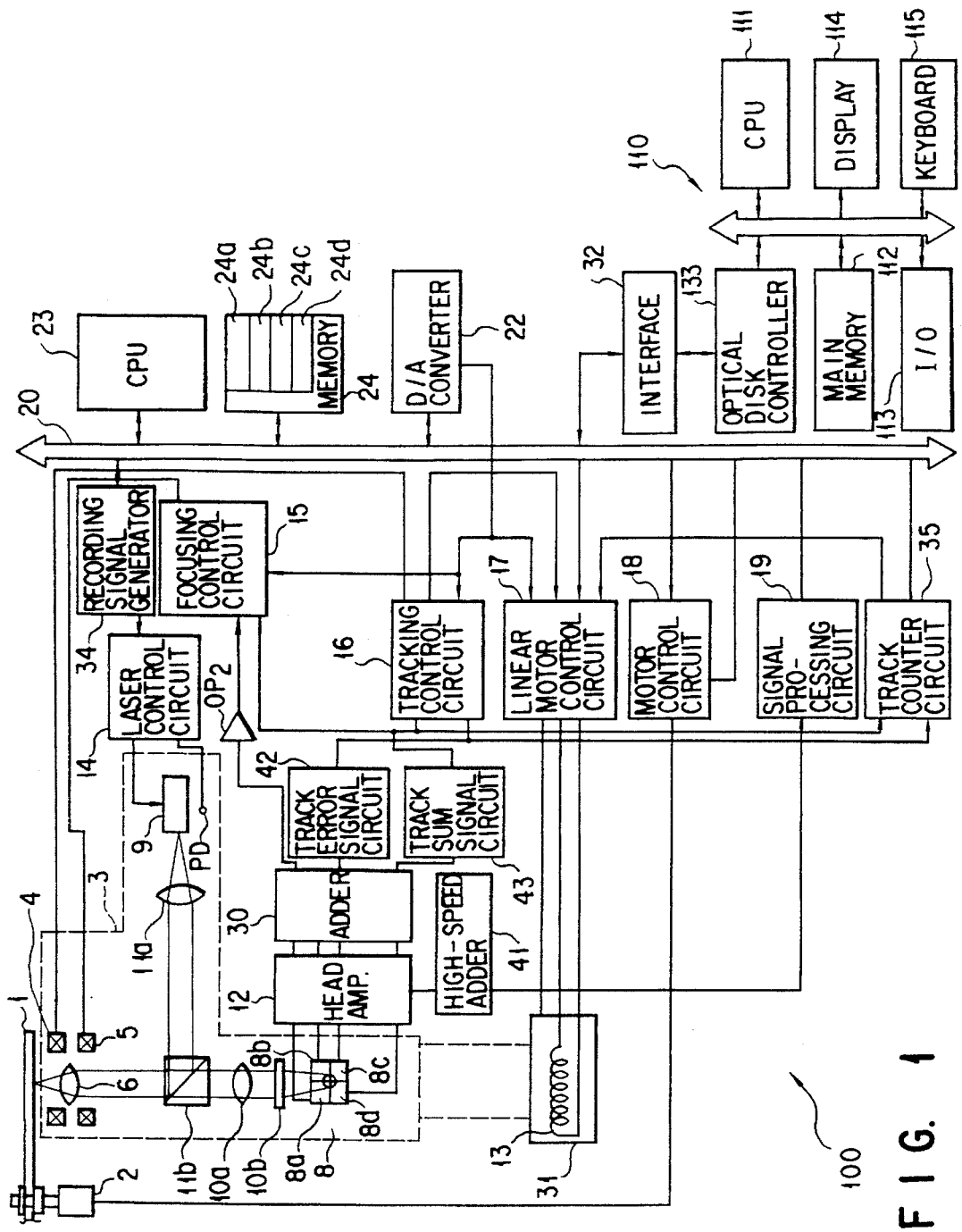
F I G. 1

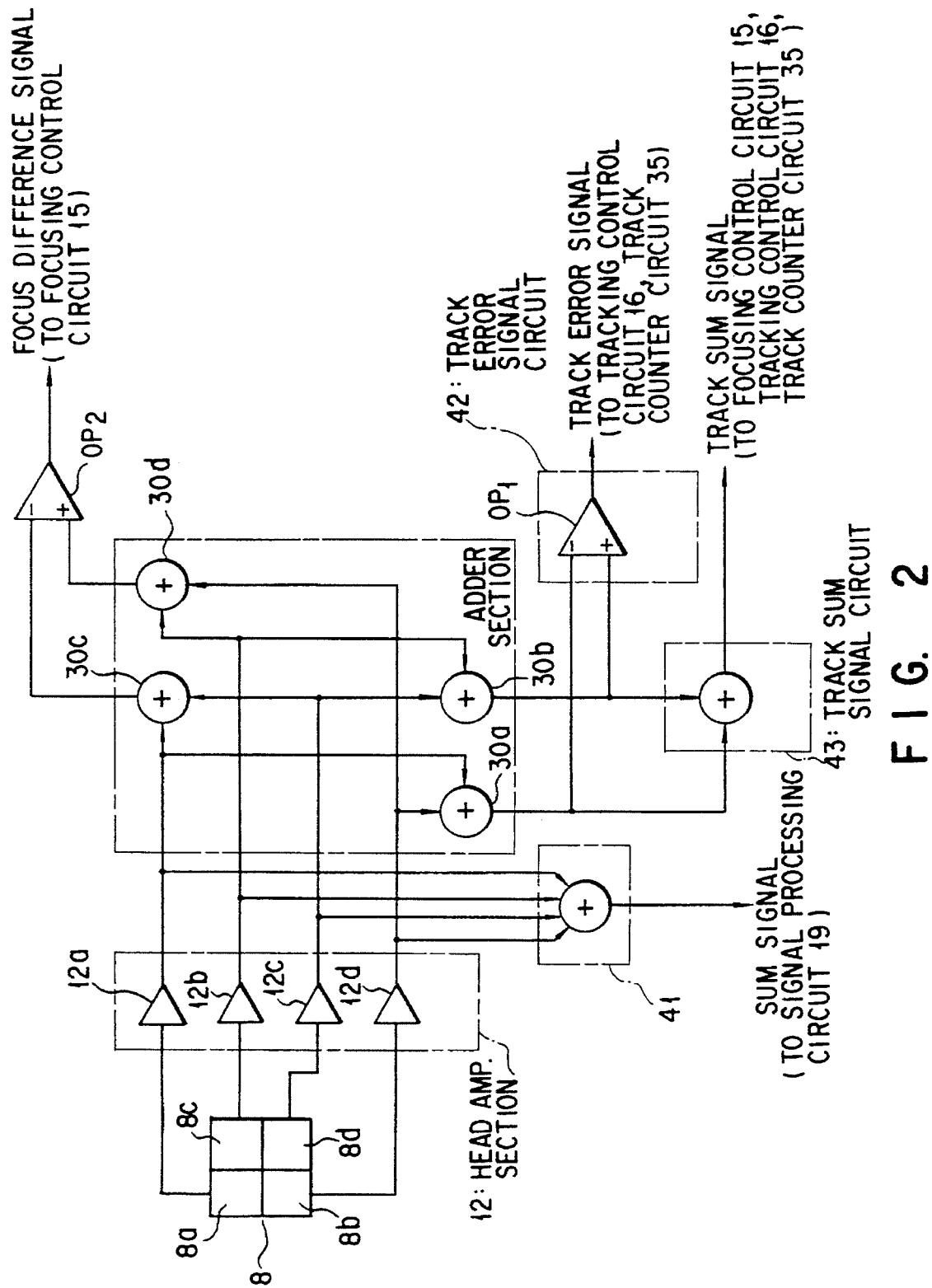
F I G. 2

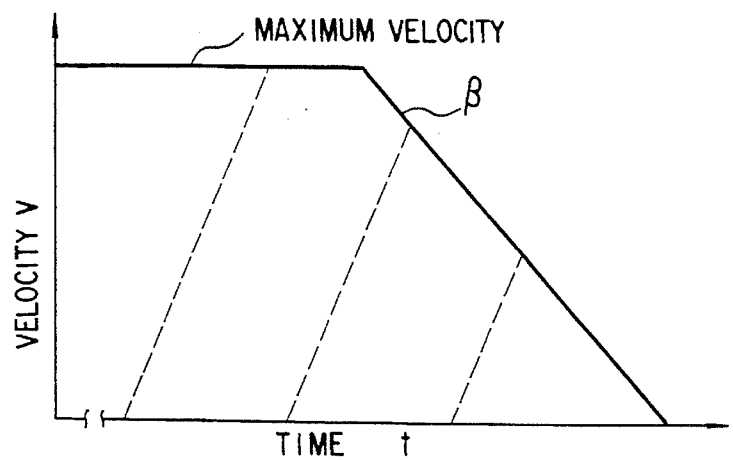
FIG. 4
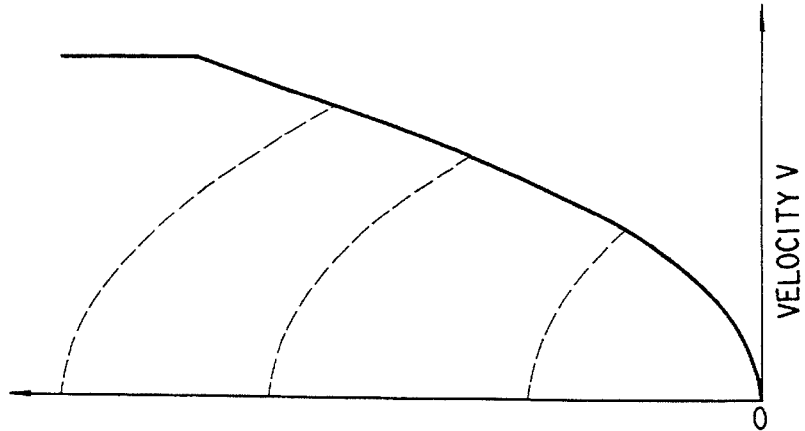
FIG. 5
| NO. OF REMAINING TRACKS | TARGET VELOCITY |
|---|---|
| 0 | 0 |
| 1 | 0.015 |
| ⋮ | ⋮ |
| 10 | 0.047 |
| ⋮ | ⋮ |
| 45 | 0.100 |
| ⋮ | ⋮ |
| 101 | 0.150 |
| ⋮ | ⋮ |
| 179 | 0.200 |
FIG. 6

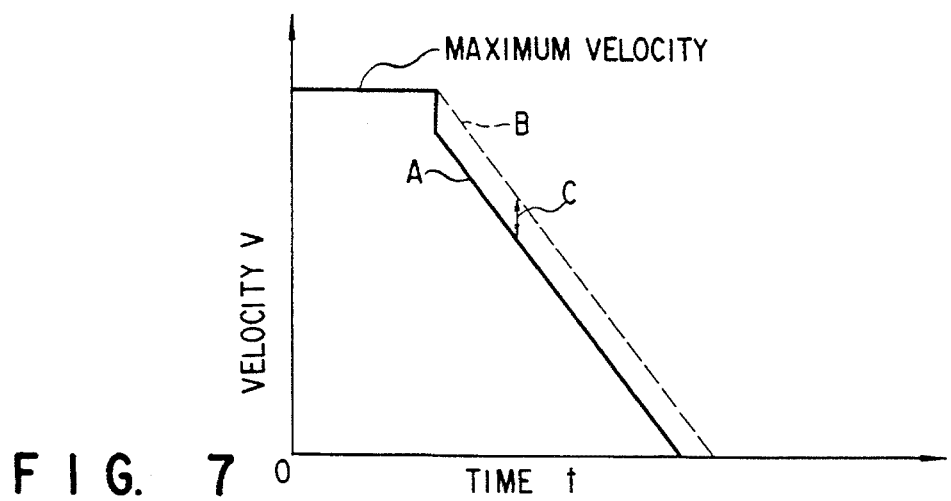
F I G. 7
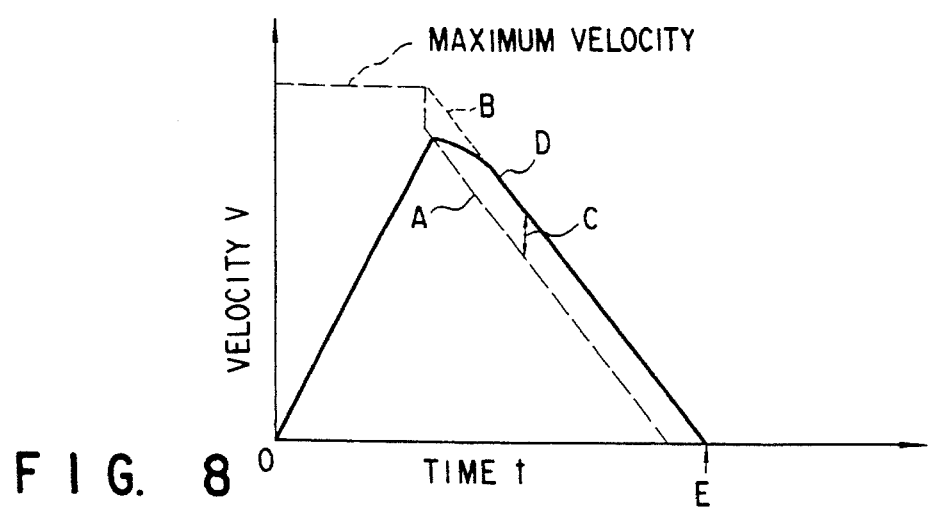
F I G. 8
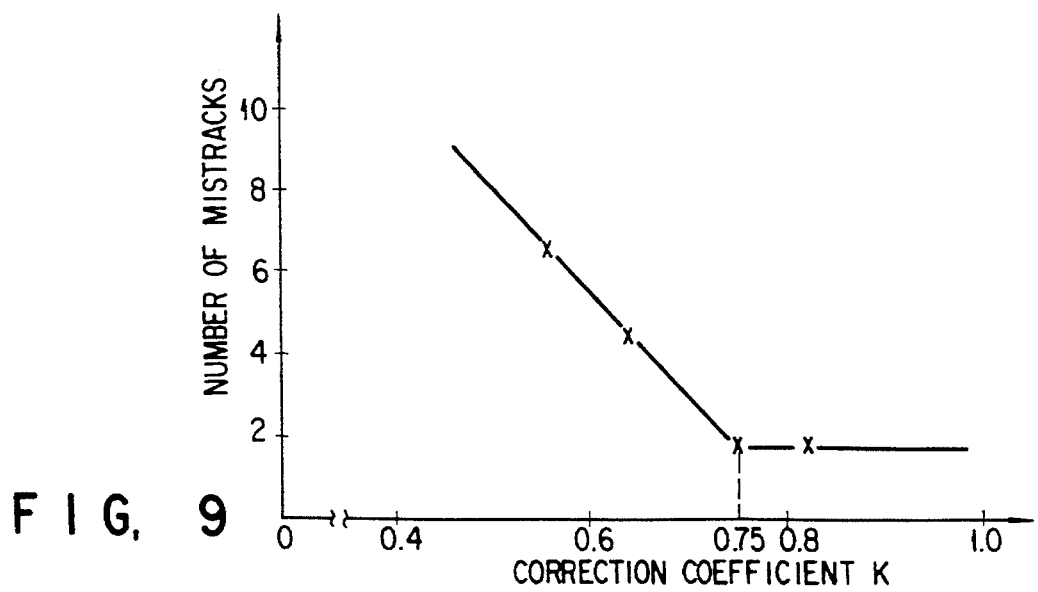
F I G. 9

OPTICAL DISC APPARATUS WITH ACCESSING USING ONLY REFERENCE VELOCITY DURING ACCELERATION AND REFERENCE AND MOVING VELOCITIES DURING DECELERATION

BACKGROUND OF THE INVENTION

1. Field of the Invention

This invention relates to an information processing apparatus for reproducing the information recorded on a recording medium such as an optical disk with recording tracks, and more particularly to an information processing apparatus capable of an improved seek operation.

2. Description of the Related Art

Optical-disk apparatuses have been put to practical use which record and reproduce information on and from an optical disk with recording tracks by means of laser light emitted from a semiconductor laser provided on an optical head.

In such optical-disk apparatuses, the optical head is moved radially across the optical disk, or so as to cross tracks, by means of a linear motor. The movement of the optical head by the linear motor causes a spot of laser light to move to a target track. In some optical-disk apparatuses, when the optical head has approached the target track, the moving velocity (hereinafter, referred to as the velocity) of the optical head is controlled according to the decelerating reference speed data, as disclosed in Jpn. Pat. Appln. KOKAI Publication No. 1-271921.

In the case of the above-mentioned type of apparatus, a velocity control system for controlling the velocity of an optical head is designed to decrease the velocity of the optical head as the light spot approaches the target track. The velocity trajectory (or the target velocity which is designed for the optical head to move along) itself designed to include the decelerating velocity data is referred to for the reference velocity during a seek operation. In this case, at the time when the light spot has reached the target track, the velocity of the light spot must be sufficiently slow so that a tracking operation (i.e., the operation of centralizing the light spot on the track) can be effected reliably.

However, since in such an optical disk apparatus, the control band of the velocity control system (or the response characteristic) has a finite value, there arises the velocity deviation of the actual velocity of the optical head from the reference speed (equal to the velocity trajectory) during deceleration. Specifically, because the optical head's actual velocity is greater than the reference velocity, the optical head's velocity has not become sufficiently low when the head has reached the target track. As a result, in the prior art, the head has sometimes failed to switch over to a tracking operation. Consequently, it has been difficult to shorten the moving (seek) time of the optical head. To reduce the velocity deviation described above, for example, disturbance tolerance servo systems for optical disk drives have the structure of a two-degrees-of-freedom control system where a feedforward section and a phase-delay compensation section are added to a conventional gain compensation section, as disclosed in "A Collection of Papers Read in the Lecture Given in the Information, Intelligence, and Precision Equipment Division of the Mechanics Society of Japan [No. 920–67] IIP'," Tokyo, Oct. 20–21, 1992. Since many branches and junctions of signal paths are required in the velocity control system, this approach, however, has the disadvantages of making the control system complex and consequently increasing the cost of putting the product to practical use.

SUMMARY OF THE INVENTION

The object of the present invention is to provide an information processing apparatus capable of reliably performing a tracking operation after seek operation and to short the seek time.

The foregoing object is accomplished by providing an information processing apparatus comprising: means for acquiring the information recorded along tracks; first sensing means for sensing the distance from the current position of the acquiring means to the target track; means for storing the reference velocity data of the acquiring means corresponding to the distance sensed by the first sensing means, the reference velocity data containing deceleration data for the acquiring means to be decelerated as approaching the target track, and the deceleration data being a velocity obtained by subtracting a steady-state velocity deviation from the velocity trajectory of the acquiring means; means for moving the acquiring means toward the target track so as to cross the tracks, according to the reference velocity data stored the storing means; second sensing means for sensing the current velocity of the acquiring means moved by the moving means; and means for comparing the current velocity sensed at the second sensing means with the velocity indicated by the reference velocity data supplied to the moving means and, when there is a difference between the two, controlling the moving means so that the current velocity may coincide with the velocity indicated by the reference velocity data, thereby causing the acquiring means to be decelerated at a velocity equal to the velocity trajectory.

With this invention, the reference velocity data of the optical head corresponding to the number of the remaining tracks to the target track is stored, and on the basis of the reference velocity data, the velocity of the optical head is controlled. The reference velocity data contains the maximum velocity region data and deceleration data about the optical head. The deceleration data is obtained by subtracting the steady-state velocity deviation from the velocity trajectory. The steady-state velocity deviation is obtained from the characteristic of the optical-head velocity control system. When the optical head is moved, the reference velocity data corresponding to the number of the remaining tracks between the current position of the optical head and the target position is read. On the basis of this read-out reference velocity data, a linear motor for driving the optical head is controlled.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

FIG. 1 is a block diagram of an optical disk apparatus associated with an information processing apparatus of the present invention;

FIG. 2 is a diagram for explaining the optical sensor, head amplifier section, and adder section of FIG. 1;

FIG. 4 is a diagram of a velocity trajectory with time on the horizontal axis;

FIG. 5 is a diagram of an example of the velocity trajectory with the number of the remaining tracks on the horizontal axis;

FIG. 6 is a table of velocity trajectories;

FIG. 7 is a diagram for explaining the velocity trajectory and the reference velocity;

FIG. 8 shows the velocity trajectory and the actual velocity of the optical head with time on the horizontal axis;

FIG. 9 shows the number of mistracks with respect to the correction coefficient;

DETAILED DESCRIPTION OF THE PREFERRED EMBODIMENTS

Figure 3:
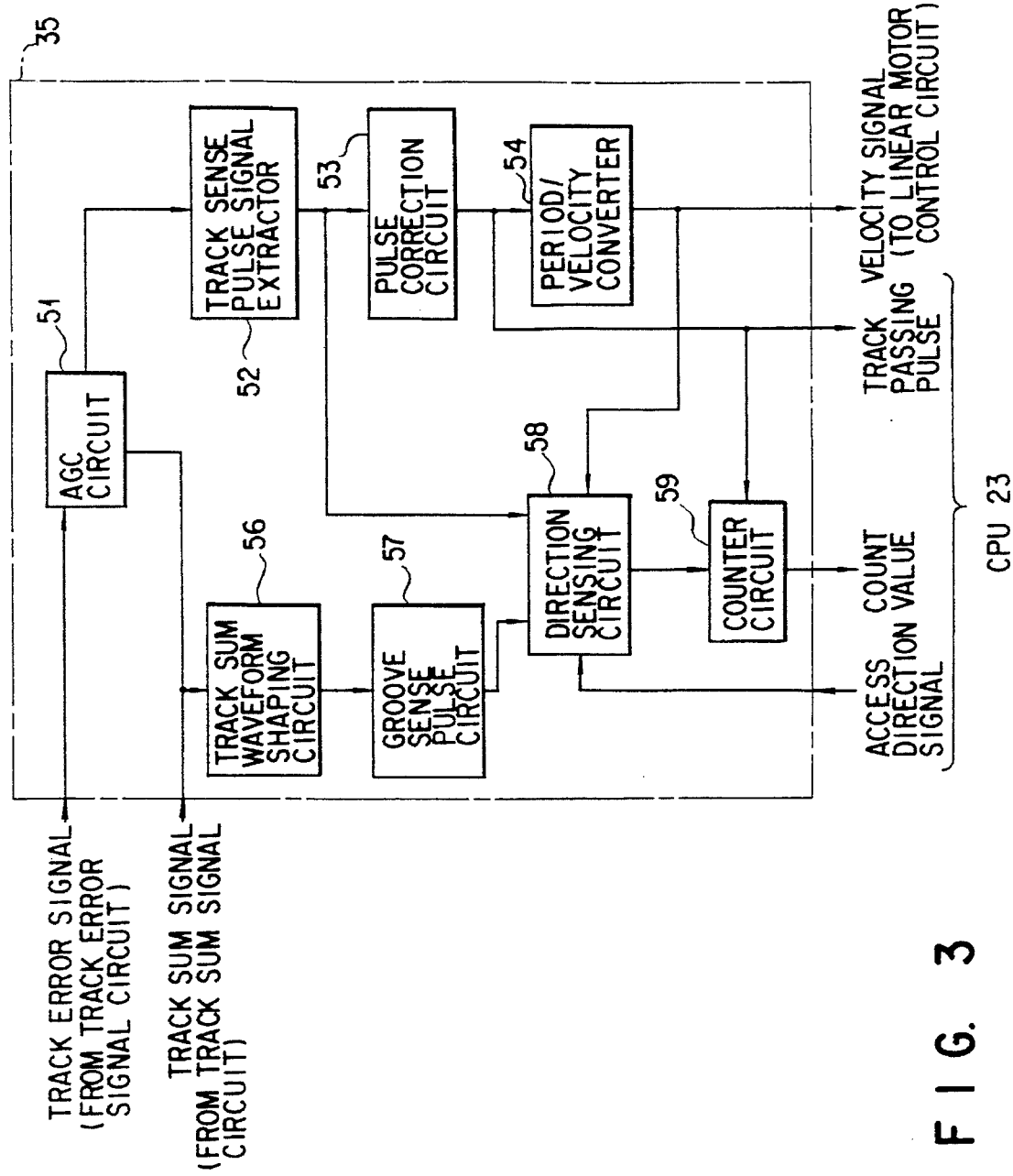
FIG. 3 is a block diagram of the track counter of FIG. 1.

Hereinafter, a first embodiment of the present invention will be explained with reference to the accompanying drawings.

FIG. 1 shows an optical disk apparatus 100 associated with an information processing apparatus of the present invention and a host apparatus 110 connected to this processing apparatus. The host apparatus 110 contains an optical disk controller 33, a CPU 111, a main memory 112, an I/O section 113, a display 114, and a keyboard 115.

At the surface of an optical disk 1, recording tracks (grooves) are formed spirally or concentrically. The optical disk 1 is rotated at, e.g., a constant linear velocity by a motor 2, which is controlled by a motor control circuit 18. The recording and reproducing of information on and from the optical disk 1 is effected by an optical head 3 provided under the optical disk 1. While in this embodiment, an optical disk allowing the recording of information by the formation of pits in the recording layer is used, an optical disk with a recording layer presenting a phase change or a multilayer recording film or a magneto-optical disk may be used. To use these optical disks, the construction including the optical head must be modified accordingly.

In the optical head 3, an object lens 6 is held by a wire or leaf spring (not shown). The object lens 6 is moved in the focusing direction (along the optical axis of the lens) by a driving coil 5 and in the tracking direction (in the direction perpendicular to the optical axis of the lens) by a driving coil 4. The laser light generated by a semiconductor laser oscillator 9 driven by a laser control circuit 14 passes through a collimator lens 11a, a half prism 11b, and the object lens 6, and is focused as a small spot onto the optical disk 1. The reflected light from the optical disk 1 passes through the object lens 6, the half prism 11b, a condenser lens 10a, and a cylindrical lens 10b, and is directed to an optical sensor element 8. The optical sensor element 8 is composed of four quadrant optical sensor cells 8a, 8b, 8c, and 8d.

FIG. 2 shows the arrangement of the optical sensor element 8, a head amplifier section 12, and an adder section 30 in more detail. Amplifiers 12a to 12d constitute the head amplifier section 12, and adders 30a, 30b, 30c, and 30d form the adder section 30.

The output signal of the optical sensor cell 8a of the optical sensor element 8 is supplied via the amplifier 12a to one input of each of the adders 30a and 30c. The output signal of the optical sensor cell 8c is supplied via the amplifier 12b to one input of each of the adders 30b and 30d. The output signal of the optical sensor cell 8b is supplied via the amplifier 12d to the other input of each of the adders 30a and 30d. The output signal of the optical sensor cell 8d is supplied via the amplifier 12c to the other input of each of the adders 30b and 30c. The output signals of the optical sensor cells 8a, 8b, 8c, and 8d of the optical sensor element 8 are supplied via the amplifiers 12a, 12b, 12c, and 12d to a high-speed adder 41.

The output signal of the adder 30a is supplied to the inverting input terminal of a differential amplifier OP1 constituting a track error signal circuit 42. The output signal of the adder 30b is supplied to the noninverting input terminal of the differential amplifier OP1. With these signals applied, the differential amplifier OP1 supplies a track error signal (or a track difference signal) indicating the difference between the outputs of adders 30a and 30b to a tracking control circuit 16 and a track counter circuit 35 in FIG. 1.

The output signals of the adders 30a and 30b are supplied to a track sum signal circuit 43 made up of an adder. The track sum signal circuit 43 supplies a track sum signal indicating the sum of the output signals of the adders 30a and 30b to a focusing control circuit 15, the tracking control circuit 16, and the track counter circuit 35. The track sum signal supplied from the track sum signal circuit 43 reflects the differences in the reflectivity on the surface of the optical disk 1 and the diffraction when light crosses the track grooves.

In FIG. 1, the tracking control circuit 16 generates a tracking signal according to the track error signal supplied from the differential amplifier OP1 and the track sum signal supplied from the track sum signal circuit 43. The tracking signal is supplied to the driving coil 4 of the tracking direction. The track error signal used in the tracking control circuit 16 is also supplied to a linear motor control circuit 17.

The track counter circuit 35, using the track error signal from the track error signal circuit 42 and the track sum signal from the track sum signal circuit 43, senses not only the light spot position (track number) on the optical disk 1, but also the velocity of the light spot along the radius of the optical disk. The track number and the velocity sensed at the track counter circuit 35 are supplied to a CPU 23 and the linear motor control circuit 17, respectively. The pulses supplied from a pulse correction circuit 53, explained later, in the track counter circuit 35 are transferred as track passing pulses to the CPU 23. The linear motor control circuit 17 controls the current flowing through a driving coil 13 of a linear motor 31 explained later on the basis of the track error signal from the tracking control circuit 16, the reference velocity supplied via a D/A converter 22 from the CPU 23, and the current velocity supplied from the track counter circuit 35.

The output signal of the adder 30c of FIG. 2 is supplied to the inverting input terminal of a differential amplifier OP2. The output signal of the adder 30d is supplied to the noninverting input terminal of the differential amplifier OP2. With these signals supplied, the differential amplifier OP2 supplies a signal indicating the difference between the outputs of the adders 30c and 30d to the focusing control circuit 15. The output signal of the focusing control circuit 15 is supplied to the focusing driving coil 5, which is controlled so that the laser light may be always properly focused on the optical disk 1.

After the focusing and the tracking have been effected as described above, the sum signal of the outputs of the individual optical sensor cells 8a to 8d of the optical sensor element 8, i.e., the output of the high-speed adder 41 reflects the changes of the reflected light from pits and grooves formed on the tracks. This signal is supplied to a signal processing circuit 19, which reproduces the recorded information and address information (track number, sector number, etc.). The reproduced signal from the signal processing circuit 19 is supplied via an interface 32 to an optical disk controller 33 of the host apparatus. In the preceding stage to the laser control circuit 14, a recording signal generator circuit 34 for modulating the recording signal is provided.

In the optical disk apparatus, there is provided a D/A converter 22 for exchanging information between the focusing control circuit 15, tracking control circuit 16, linear motor control circuit 17, and CPU 23. The laser control circuit 14, focusing control circuit 15, tracking control circuit 16, linear motor control circuit 17, motor control circuit 18, signal processing circuit 19, recording signal generator circuit 34, and track counter circuit 35 are controlled by the CPU 23 via a bus line 20. The CUP 23 carries out a specific operation according to the program stored in a memory 24.

FIG. 3 is a block diagram of the track counter circuit 35 of FIG. 1. As shown in the figure, the track counter circuit 35 comprises an AGC (automatic gain control) circuit 51, a track sense pulse signal extractor circuit 52, a pulse correction circuit 53, a period/velocity converter circuit 54, a track sum waveform shaping circuit 56, a groove sense pulse circuit 57, a direction sensing circuit 58, and a counter 59.

The AGC circuit 51, using a track sum signal, keeps the amplitude of the track error signal supplied from the track error signal circuit 42 at a constant level and eliminates noise signals caused by dust, dirt, flaws, etc. The output signal from the AGC circuit 51 is supplied to the track sense pulse signal extractor circuit 52.

The track sense pulse signal extractor circuit 52, using the gain-controlled track error, supplies a pulse per groove in the track. The pulse correction circuit 53 removes noises from the track sense pulse signal, and supplies the noise-free signal to the period/velocity converter circuit 54, counter 59, and CPU 23.

The period/velocity converter circuit 54 generates the velocity of the optical head 3 by dividing the period of the pulse supplied from the pulse correction circuit 53 by time t (u/t). The velocity signal thus obtained is supplied to the linear motor control circuit 17. The track sum waveform shaping circuit 56 shapes the waveform of the track sum signal from the track sum signal circuit 43, and supplies the waveform-shaped track sum signal to the groove sense pulse circuit 57.

The groove sense pulse circuit 57 senses a groove from the track sum signal supplied from the track sum waveform shaping circuit 56 and supplies a groove sense pulse. The groove sense pulse from the groove sense pulse circuit 57 is supplied to the direction sensing circuit 58. The direction sensing circuit 58, using the phase difference between the track sense pulse and the groove sense pulse, judges the moving direction of the light spot on the optical disk 1.

The counting direction (counting up or down) of the counter 59 is switched by the direction signal from the direction sensing circuit 58. Being switched in this way, the counter 59 counts up or down according to the track sense pulses from the pulse correction circuit 53. Before a track seek operation, the number of tracks to be crossed is set for the counter 59. As a result, the contents of the counter 59 always indicate the number of the track on which the light spot is located on the optical disk (refer to Jpn. Pat. Appln. KOKAI Publication No. 5-36095).

The memory 24 is provided with a velocity trajectory table 24a in which the velocity trajectory corresponding to the moving distance, i.e., the number of the remaining tracks to the target position is recorded, a number-of-remaining-tracks count section 24b in which the number of the remaining tracks from the current track to the track of the target position is recorded, a reference velocity computing table 24c in which value C for obtaining a reference velocity lower than the velocity trajectory by the specified value C during the deceleration is stored, and a reference velocity table 24d in which a previously computed reference velocity is stored.

The velocity trajectory contains a maximum-speed region of the optical head 3 and a deceleration region for decelerating to an enough velocity to perform a tracking operation near the track of the target position. The time-speed characteristic shown in FIG. 4 can be graphed with the number of tracks on the horizontal axis as shown in FIG. 5. In the figures, the dotted lines represent examples of the accelerating courses when the optical head 3 is driven using the velocity trajectory. In the velocity trajectory table 24a, the velocity trajectories corresponding to the number of the remaining tracks as shown in FIGS. 5 and 6 are stored.

FIG. 7 shows reference velocity A of the present invention used in actual control with respect to velocity trajectory B. The CPU 23 reads value C from the reference velocity computing table 24c and obtains reference velocity A lower than the velocity trajectory B by the specified value C.

When being supplied with the destination target track number of the optical head 3 from an optical disk controller 33 of the host apparatus 110, the CPU 23 computes the number of tracks to be crossed, which is the difference between the number of the track of the target position and the current track number indicated by the counter 59 of the track counter circuit 35. The number of tracks to be crossed is stored as the initial value of the number of the remaining tracks in the number-of-remaining-tracks count section 24b. The CPU 23 counts down the contents of the number-of-remaining-tracks count section 24b each time a track passing pulse is supplied from the track counter circuit 35. The CPU 23 also reads the velocity trajectory corresponding to the number of the remaining tracks in the number-of-remaining-tracks count section 24b from the velocity trajectory table 24a, and calculates a reference velocity lower than the velocity trajectory by the specified value C, using the reference velocity computing table 24c. The CPU 23 supplies the computed reference velocity to the linear motor control circuit 17 via the D/A converter 22.

Now, the specified value C will be described.

The velocity during deceleration can be considered to be a response of the velocity control system to a ramp input, provided the deceleration is constant. If the transfer function of the velocity control system is G(s), a steady-state deviation of E for a unit ramp input can be expressed as:

$$E = \lim_{s \to 0} 1/sG(s)$$

When the velocity control system of FIG. 1 is assumed to be of the I type, the transfer function can be expressed as:

$$G(s) = 2\pi fc/s$$

where fc is the control band of the velocity control system.

Therefore, if a decelerating velocity is d, the steady-state velocity deviation Ed is given by $Ed = d/(2\pi fc)$ Namely, it can be seen that when deceleration is effected at a deceleration of d, the velocity of the optical head 3 is greater by Ed than the velocity trajectory stored in the velocity trajectory table 24a.

Therefore, in this embodiment, the value k×Ed obtained by multiplying the steady-state deviation Ed by correction efficient k is defined as the specified value C and velocity control is performed using a value less than the velocity trajectory by k×Ed as a reference velocity during deceleration. This enables the actual velocity of the optical head to be controlled to a value close to the velocity trajectory.

Reference velocity=Velocity trajectory–k×Ed

FIG. 8 shows the actual velocity D when the optical head 3 is controlled using reference velocity A less than the designed velocity trajectory B by the specified value C. The actual velocity D overlaps with the designed target velocity B. At the time E when a tracking operation is effected, the actual velocity of the optical head 3 is already sufficiently low. Since the actual velocity deviation approaches the steady-state deviation Ed gradually as when the deceleration just started, it is desirable that in a short seek operation, the specified value C should be smaller than the steady-state deviation Ed.

During a seek operation, the time required for the light spot to move from a track to the next track varies significantly. Because the current velocity is obtained by dividing the track sense pulse period by the time, the change of the velocity leads to the change of the sensing time of the velocity. Therefore, the response frequency of the velocity control system also changes accordingly. The aforementioned correction coefficient k is for compensating for this. FIG. 9 shows the number of mistracks for correction coefficient k. The number of mistracks is the average value of the difference between the track number of the track reached by the light spot and the target track number at each seeking when random seeking is effected 1024 times. It can be seen from FIG. 9 that when correction coefficient k is smaller than 0.75, the number of mistracks increases rapidly. Therefore, it is desirable for practical use that correction coefficient k should be in the range from 1 to 0.75.

The specified value C for computing a reference velocity does not necessarily have to be a constant value as described above, it may be varied as a function of the velocity, the moving distance, the destination position, and the type of disk.

Figure 10:
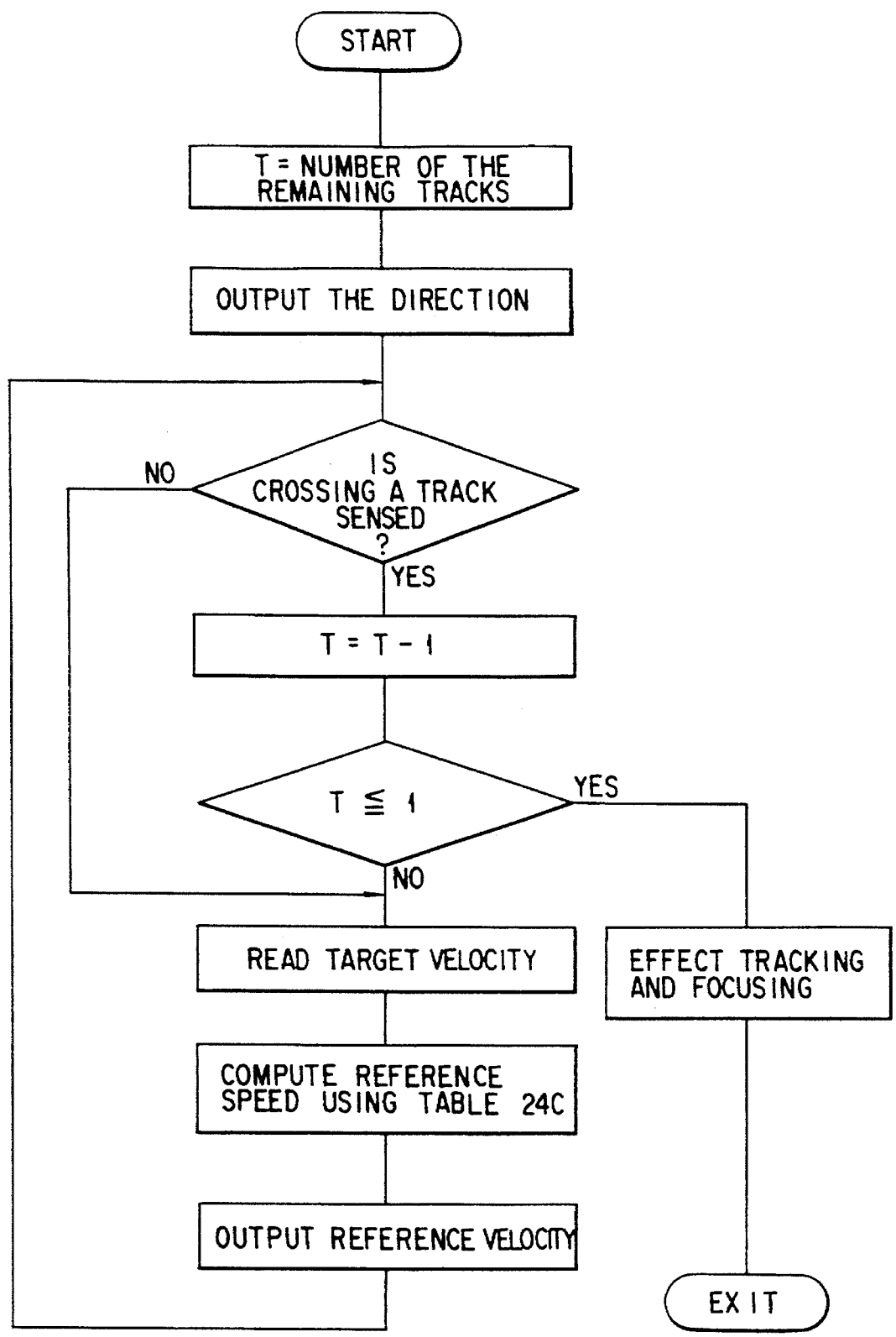
FIG. 10 is a flowchart for explaining a seek operation in a first embodiment of the present invention.

With this configuration, a seek operation of the optical head 3 will be described, referring to the flowchart of FIG. 10. Here, it is assumed that the optical head 3 is driven at a velocity shown in FIG. 7.

First, the optical disk controller 33 of the host apparatus 110 supplies the destination target track number of the optical head 3 to the CPU 23 via the interface 32 and the bus 20. The CPU 23 receives the track number indicating the current position of the optical head from the counter 59 of the track counter circuit 35. The CPU 23 calculates the difference between the target track number and the current track number. This difference is stored as the initial value of the number of the remaining tracks in the number-of-remaining-tracks memory 24b. The CPU 23 judges the moving direction of the optical head 3 on the basis of the target track number and the current track number, and supplies this direction to the linear motor control circuit 17 and the track counter circuit 35.

The CPU 23 reads the velocity trajectory corresponding to the number of the remaining tracks from the velocity trajectory table 24a, computes a reference velocity lower than the velocity trajectory by the specified value C, using the reference velocity computing table 24c, and supplies the computed reference velocity to the linear motor control circuit 17 via the D/A converter 22. However, when the number of the remaining tracks is great and the optical head is outside the deceleration region to which the reference velocity is applied, the maximum velocity is supplied to the linear motor control circuit 17.

The linear motor control circuit 17 computes the difference between the velocity trajectory from the D/A converter 22 and the current velocity Vc, and drives the linear motor 31 at a current corresponding to the difference. The CPU 23 decrements the number-of-remaining-tracks table 24b each time the light spot crosses a track.

When the number of the remaining tracks becomes 1 or less, the CPU 23 causes the focusing control circuit 15 and the tracking control circuit 16 to operate for a focusing and a tracking operation. Information is recorded or reproduced onto or from the track accessed in this way.

Figure 11:
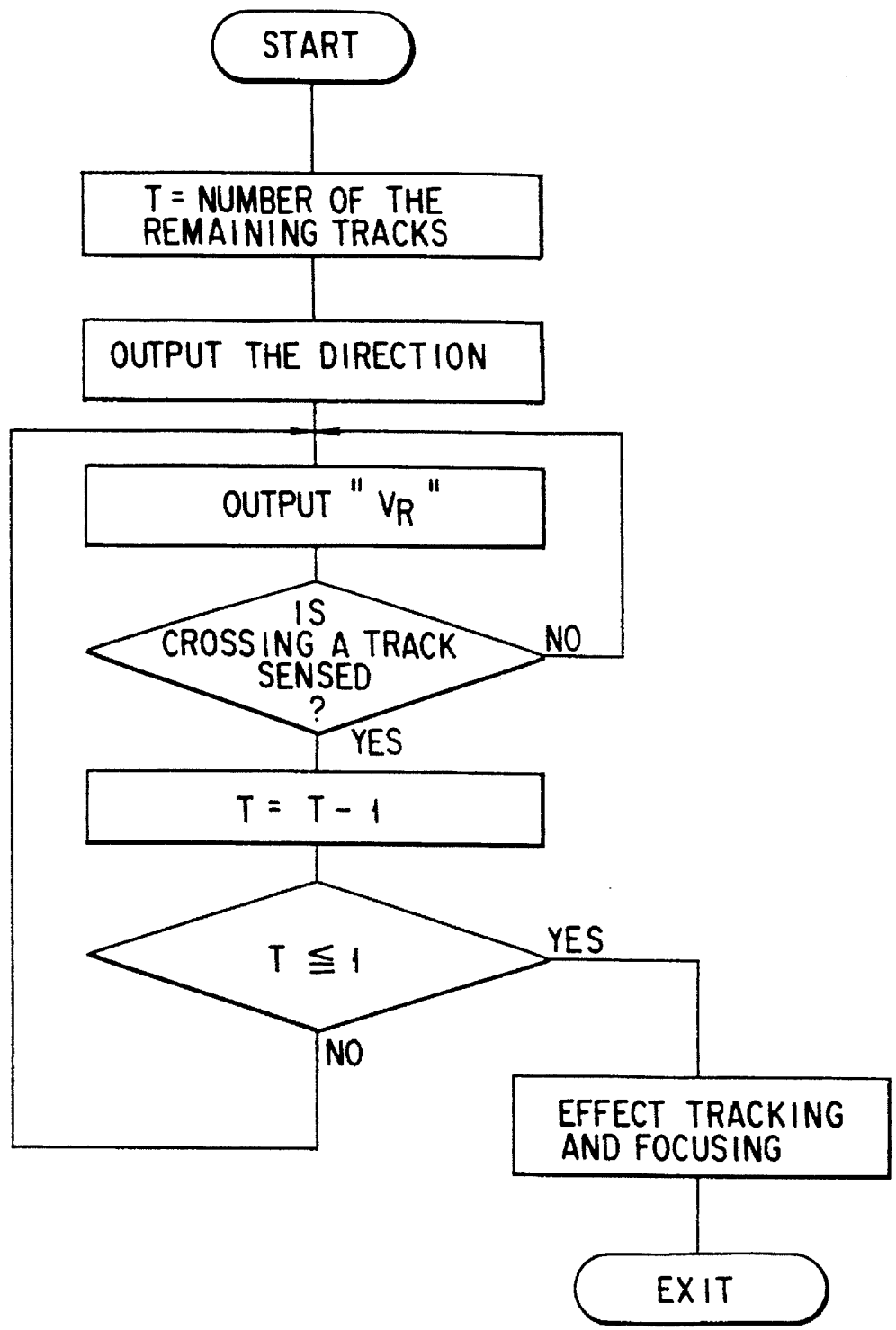
FIG. 11 is a flowchart for explaining a seek operation in a second embodiment of the present invention.

A second embodiment of the present invention will be explained. While in the first embodiment, a reference velocity is computed during a seek operation, using the contents C of the reference velocity computing table 24c, a reference velocity can be computed in advance and stored in a table 24d, and a seek operation can be controlled by directly referring to the stored reference velocity. In the table 24d, reference velocity $V_R$ (including the maximum velocity and portion A) indicated by a longer dash line is stored. A flowchart for explaining the operation of the second embodiment is shown in FIG. 11.

As described above, after having received the destination target track number of the optical head 3 from the optical disk controller 33, the CPU 23 stores the difference between the current track number and the target track number as the initial value of the number of the remaining tracks T in the number-of-remaining-tracks memory 24b.

The CPU 23 supplies the moving direction of the optical head 3 to the linear motor control circuit 17 and the track counter circuit 35. The CPU 23 reads a reference velocity $V_R$ corresponding to the number of the remaining tracks T from the table 24d, and supplied the reference velocity $V_R$ to the D/A converter 22. The D/A converter 22 supplies an analog voltage corresponding to the reference velocity $V_R$ to the linear motor control circuit 17. The linear motor control circuit 17 compares the voltages representing the current velocity Vc and the reference velocity $V_R$, and supplies a current corresponding to $V_R$–Vc. As a result, the optical head 3 is accelerated.

Each time the light spot crosses a track on the optical disk 1, the track counter circuit 35 transfers a track passing pulse to the CPU 23, which then decrements the number-of-remaining-tracks table 24b accordingly. The CPU 23 judges whether the current number of the remaining tracks T is 1 or less. If not T≦1 (i.e., NO), the CPU 23 reads the reference velocity $V_R$ corresponding to the number of the remaining tracks T and supplies $V_R$ to the D/A converter 22.

After the current velocity Vc has reached the reference velocity $V_R$, $V_R$–Vc is negative and consequently the linear motor 31 is driven in the opposite direction to that during acceleration. This decelerates the optical head. When the number of the remaining tracks becomes 1 or less, a focusing and a tracking operation are performed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical disk apparatus reproducing information recorded along tracks formed on an optical disk by accessing a target track on the optical disk, said apparatus comprising:

spot applying means for applying a light beam spot on an arbitrary track in order to reproduce the information from the track;

determining means for determining the number of remaining tracks located between the target track and a track on which the light beam spot is applied;

moving means for moving the spot applying means to move the light beam spot applied by the spot applying means;

detecting means for detecting an actual moving velocity D of the spot applying means moved by the moving means;

acceleration and deceleration control means for controlling a moving velocity of the spot applying means moved by the moving means, in response to a reference velocity which varies in accordance with the remaining track number, the acceleration and deceleration control means, when the spot applying means is located in a decelaration region in which the number of the remaining tracks is small, controlling the moving velocity of the spot applying means to decelerate in response to the actual moving velocity D of the spot applying means and the reference velocity, and when the spot applying means is located in an acceleration region, in which the remaining tracks number is large, controlling the moving velocity of the spot applying means to accelerate in response to only the reference velocity;

first storing means for storing a velocity trajectory curve B which is determined as an object velocity of the spot applying means in response to the remaining track number;

second storing means for storing a specific value C representing a steady-state velocity deviation wherein the reference velocity is smaller than the velocity trajectory curve B by the specific value C; and supplying means for supplying to the acceleration and deceleration control means a maximum velocity of the velocity trajectory curve B stored in the first storing means as the reference velocity when the spot applying means is located in the acceleration region, and for supplying to the acceleration and deceleration control means a moving velocity lower than the velocity trajectory curve B by the specific value C stored in the second storing means as the reference velocity, so that the actual moving velocity D of the spot applying means coincides with the velocity trajectory curve B when the spot applying means is located in the deceleration region.

* * * * *